May 2, 1961 T. B. SHIU 2,982,074
CLOSING AND SEALING MECHANISM
Filed Aug. 13, 1957 7 Sheets-Sheet 1
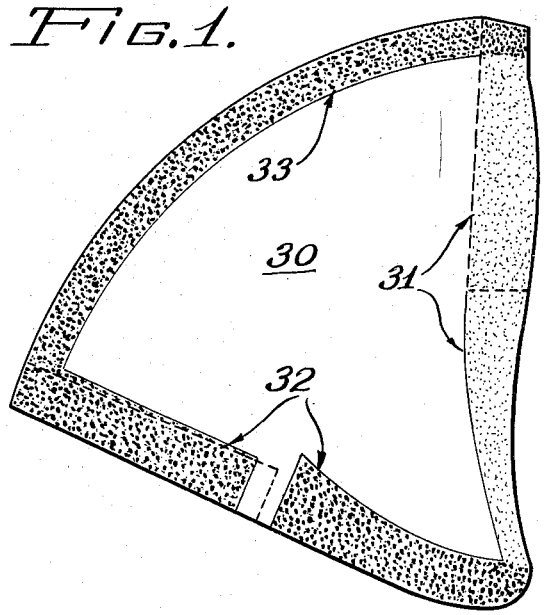
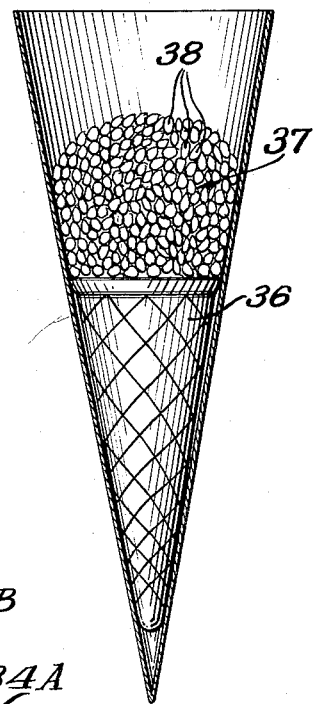
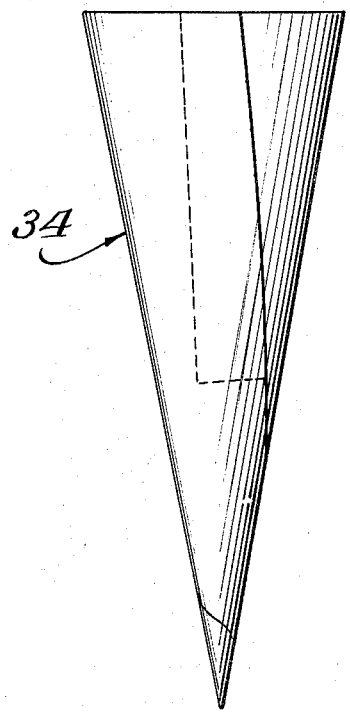
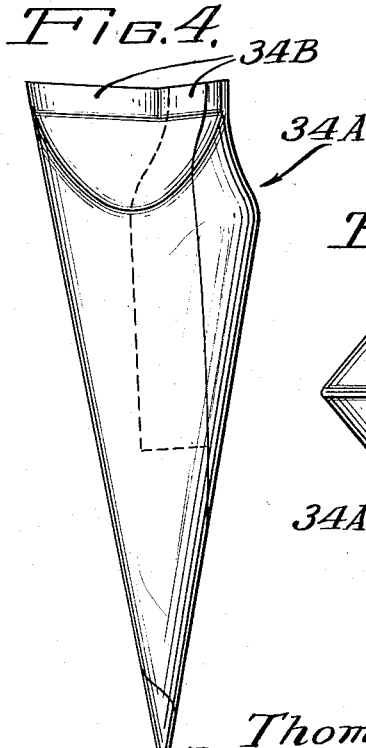
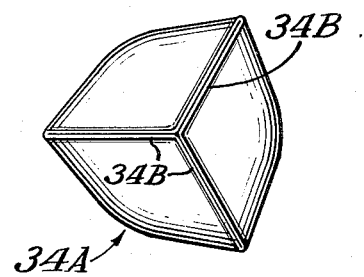
Inventor:
Thomas B. Shiu
By Wigman & Stone
Atty.

May 2, 1961 T. B. SHIU 2,982,074
CLOSING AND SEALING MECHANISM
Filed Aug. 13, 1957 7 Sheets-Sheet 2

Inventor:
Thomas B. Shiu
By Wigner S. Stone
Atty.

May 2, 1961 T. B. SHIU 2,982,074
CLOSING AND SEALING MECHANISM
Filed Aug. 13, 1957 7 Sheets-Sheet 3

Inventor:
Thomas B. Shiu
By (signature)
Atty.

May 2, 1961  T. B. SHIU  2,982,074
CLOSING AND SEALING MECHANISM
Filed Aug. 13, 1957  7 Sheets-Sheet 4

Inventor:
Thomas B. Shiu
By Wizard S. Stone
Atty.

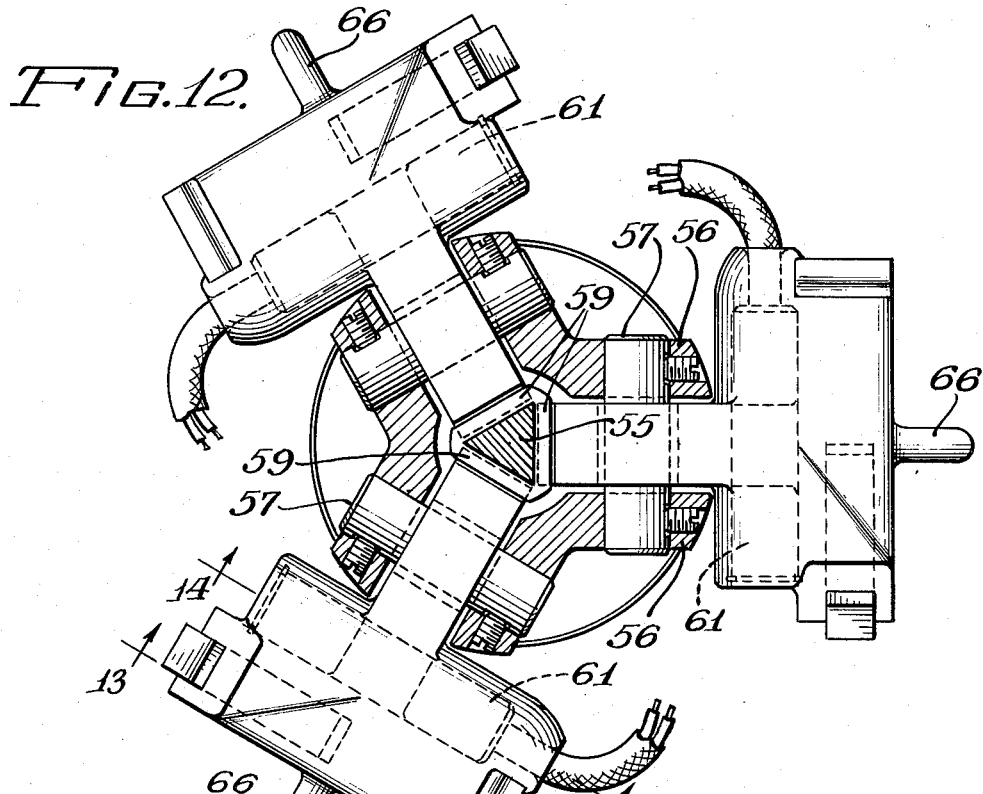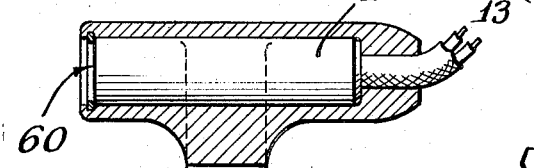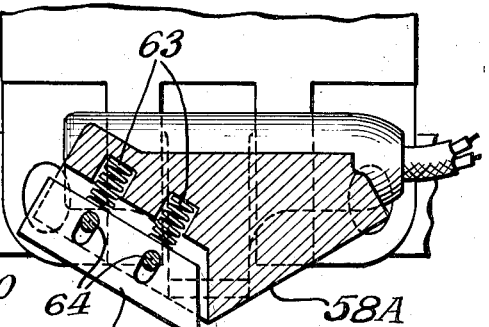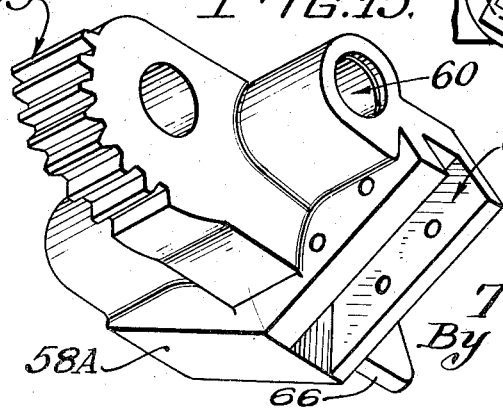

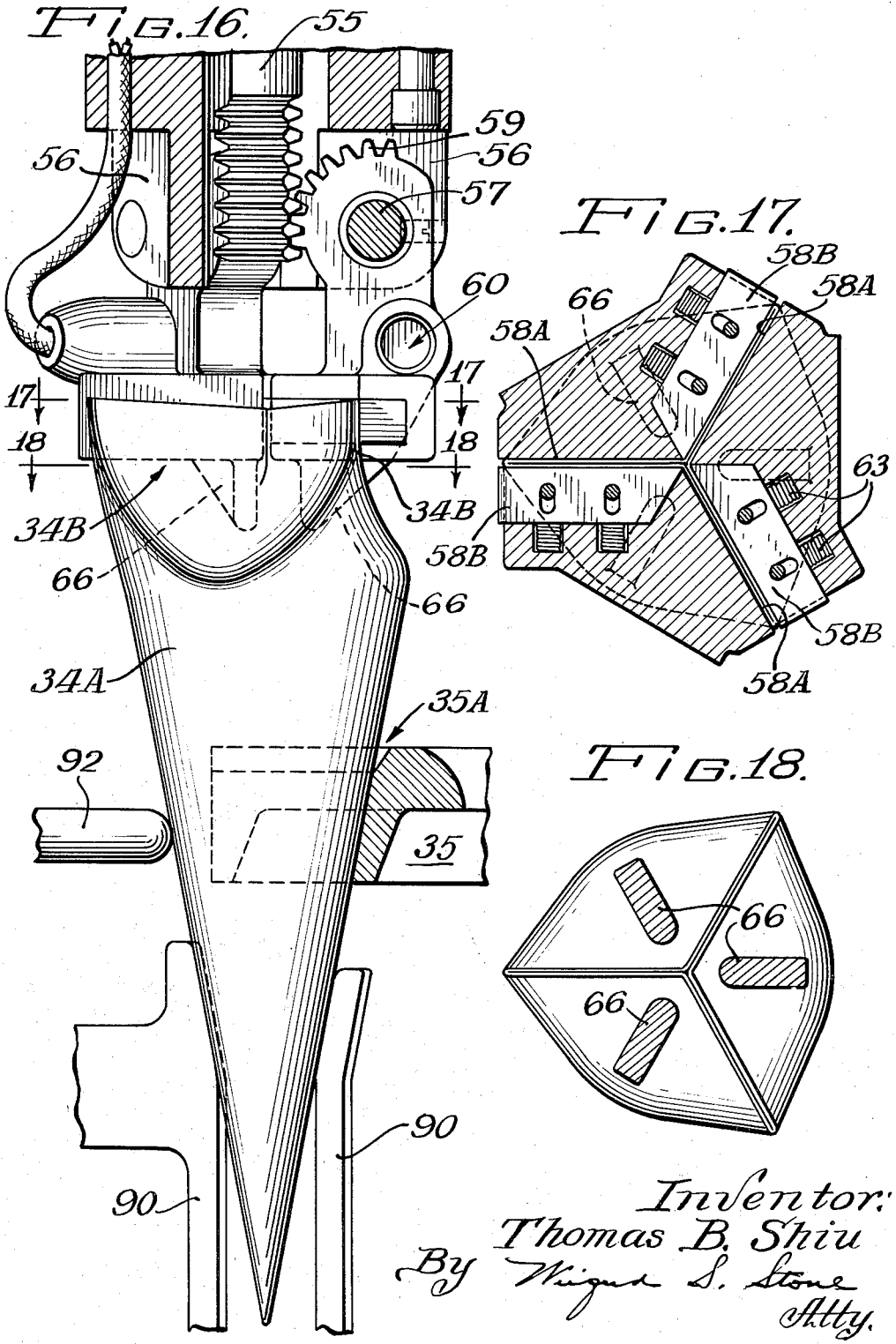

May 2, 1961  T. B. SHIU  2,982,074
CLOSING AND SEALING MECHANISM
Filed Aug. 13, 1957  7 Sheets-Sheet 7
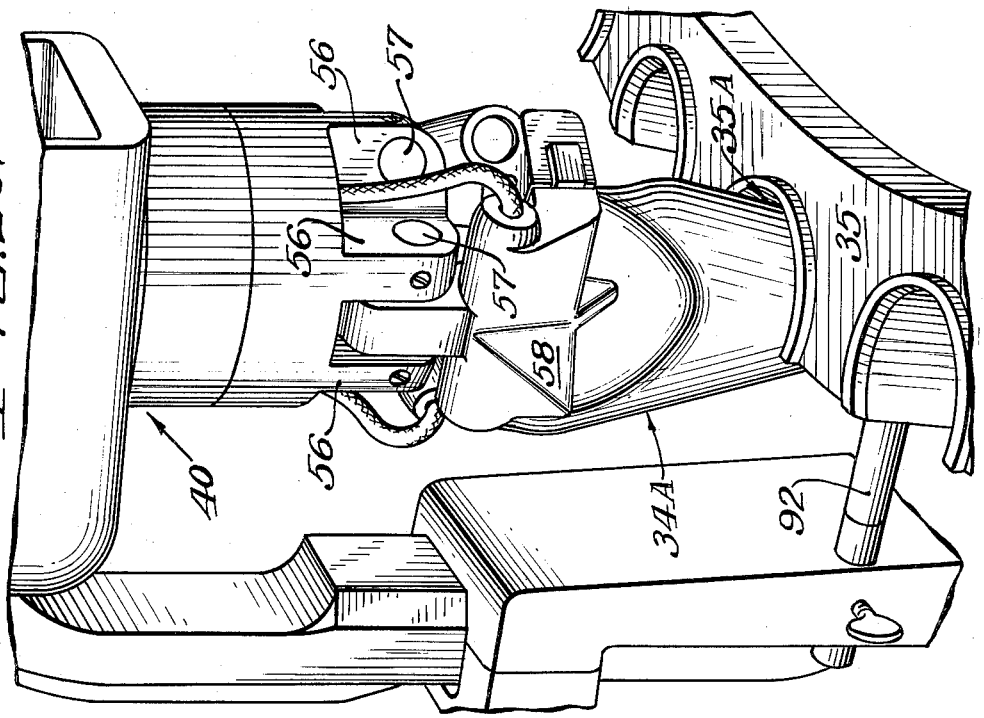
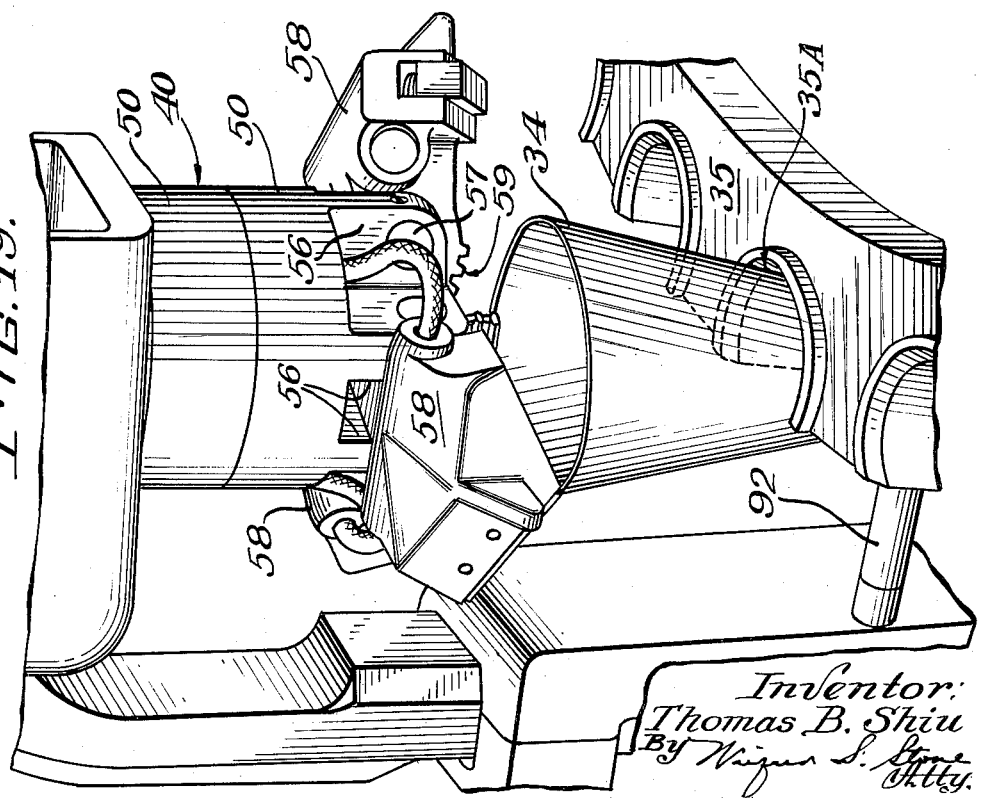
Inventor:
Thomas B. Shiu

United States Patent Office 2,982,074
Patented May 2, 1961

2,982,074

CLOSING AND SEALING MECHANISM

Thomas B. Shiu, % CPS Manufacturing Co., 5051 South Western Blvd., Chicago 9, Ill., assignor of one-fourth to Nicholas A. Cummings and one-fourth to Thomas N. Cummings, Chicago, Ill., and one-fourth to Benjamin R. Peterson, Jr., Wheaton, Ill.

Filed Aug. 13, 1957, Ser. No. 677,862

12 Claims. (Cl. 53—373)

This invention has as its principal object the provision of a fast-acting heat-sealing mechanism particularly adapted to the closure of conical paper cups used as packaging jackets for ice cream cones and the like.

Some of the more detailed features of the new sealing mechanism relate to the provision of a plurality of electrically heated sealing jaws arranged in a cluster about a center with a common concentric drive means for converging and diverging the same in unison, together with means for effecting a closing motion thereof which is initially very rapid but is adjustably slowed down and cushioned at the moment of full seizure of the paper whereby to provide a long dwell time for perfecting the actual seal without prolonging the total duty cycle for each sealing operation.

Other features relate to the provision of a compactly housed multi-jaw sealing unit synchronously cooperable with a rotary, step-by-step cone carrier to effect a trifoliate fold of the top edge portions of the cone and heat seal the same in a brief interval during which the carrier is at rest and to re-orient the sealed cone so as to clear the jaws when the carrier next advances.

Still further objects relate to the provision of the following features: a sealing jaw structure including a multifaced gear rack common to individual gear segments on each of three sealing jaws situated concentrically of the rack so as to be actuated in unison by reciprocation of the latter; a starter wing on each jaw positioned to engage a rim portion of the paper cup to effect an initial fold setting a uniform pattern for the principal folds effected by the full jaws; the situation, in heated pairs of jaws, of a solid heat-conductive face on one jaw and a yieldable complementary face on the companion jaw.

Additional aspects of novelty and utility characterizing the invention relate to details of the construction and operation of the embodiment described hereinafter in view of the accompanying drawings, in which:

Fig. 1 is a view of a prepared paper blank for making heat-sealed conical cups;

Fig. 2 is an elevation of one of the containers in open condition;

Fig. 3 is a sectional view of a formed conical cup containing an ice cream confection ready for sealing;

Fig. 4 is an elevation of the loaded container of Fig. 3 after sealing;

Fig. 5 is a top plan view of a sealed container;

Fig. 12 is an enlarged sectional detail, with parts of the closing jaws shown in plan, as viewed along lines 12—12 of Fig. 8;

Fig. 13 is an enlarged sectional fragment of one of the jaw members taken along lines 13—13 of Fig. 12;

Fig. 14 is a sectional fragment taken along lines 14—14 of Fig. 12 and showing in plan one of the jaw heaters;

Fig. 15 is a perspective one of the jaw members;

Fig. 16 is an enlarged sectional detail of the jaw head in closed condition with a cone package shown in elevation;

Fig. 17 is a horizontal section taken along lines 17—17 of Fig. 16;

Fig. 18 is a partial section plan detail looking down along lines 18—18 of Fig. 16;

Figs. 19 and 20 are fragmentary perspectives, to enlarged scale, respectively showing the jaw head in open and closed condition.

Figure 6:
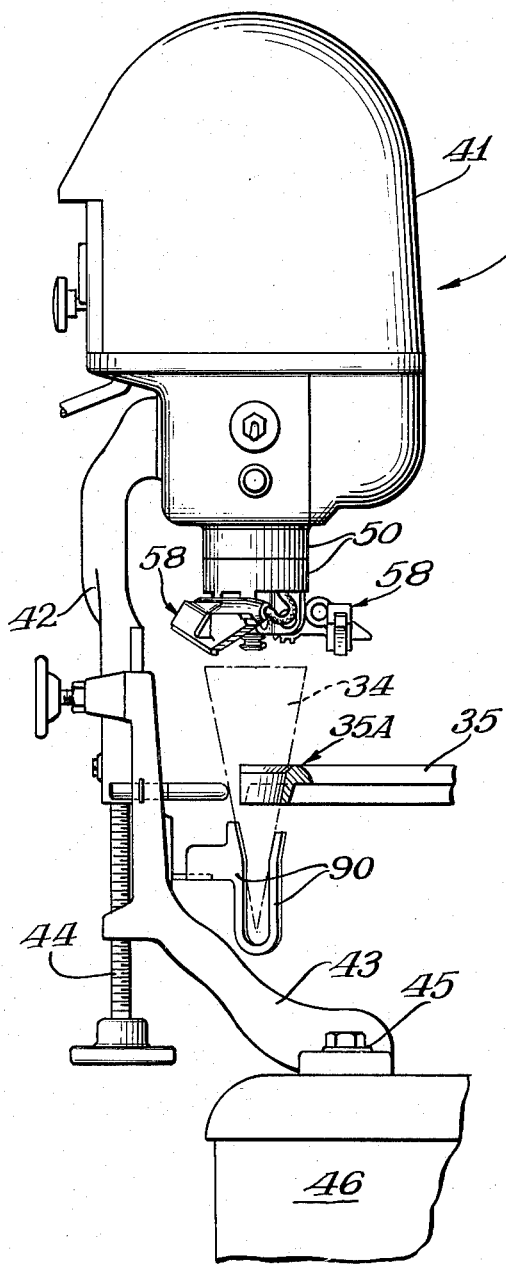
Fig. 6 is a side elevation of the sealing mechanism including fragmentary portions of a packaging machine.

The sealing mechanism of the present disclosure, while adaptable to other uses, is primarily intended to be used in conjunction with certain continuous-flow ice cream packaging machinery which forms a conical cup from a flat paper blank 30, such as shown in Fig. 1 herein, said blank being the subject matter of another copending application Serial No. 648,350, filed March 25, 1957, and being characterized by certain lanes 31, 32, 33 of heat-sealable adhesive so arranged that the prepared blank may be formed into a conical cup 34, such as shown in Fig. 2, on an automatic forming device capable of turning out the cups at a rapid rate and ready for loading immediately upon discharge from said forming apparatus.

The cup depicted in Fig. 2 normally would leave the cup-forming mechanism (not shown) in such a continuous-flow machine, and at once drop into a pocket 35A in a rotary cone carrier 35 which moves circuitously past said cup forming apparatus, a cone feeding device (not shown) and certain injection valves (not shown), all of which will ultimately (and automatically) cooperate to load the conical cup 34 with the ingredients of an ice cream confection, including (as illustrated in Fig. 3) a pastry cone 36, a charge of ice cream 37, and a coating thereon of mixed chocolate and nuts 38, following which the package will be moved by the carrier to a position beneath the sealing head 40 (shown partially in Figs. 19 and 20) to close and heat-seal the confectionary package 34A depicted in Figs. 4, 5, and 20.

Figure 7:
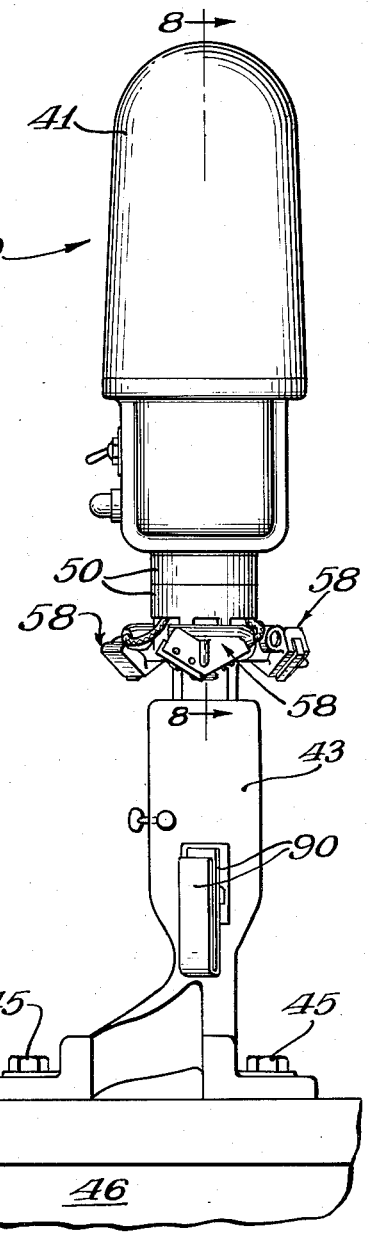
Fig. 7 is a rear view of the device of Fig. 6.

The present disclosures relate mainly to the sealing head 20, now described in view of Figs. 6 and 7 in which the unit 40 will be seen to include a shell housing 41 carried on vertically adjustable bracket members 42, 43, movable relatively by means of screw 44, the foot bracket 43 being secured as at 45 on a base unit 46 which is part of the continuous-flow forming and packing machine and which, among other things, houses the step-by-step drive mechanism (not shown) for travelling the carrier 35 around its circuit in timed relation to the operation of the other cup forming and loading instrumentalities alluded to.

Figure 8:
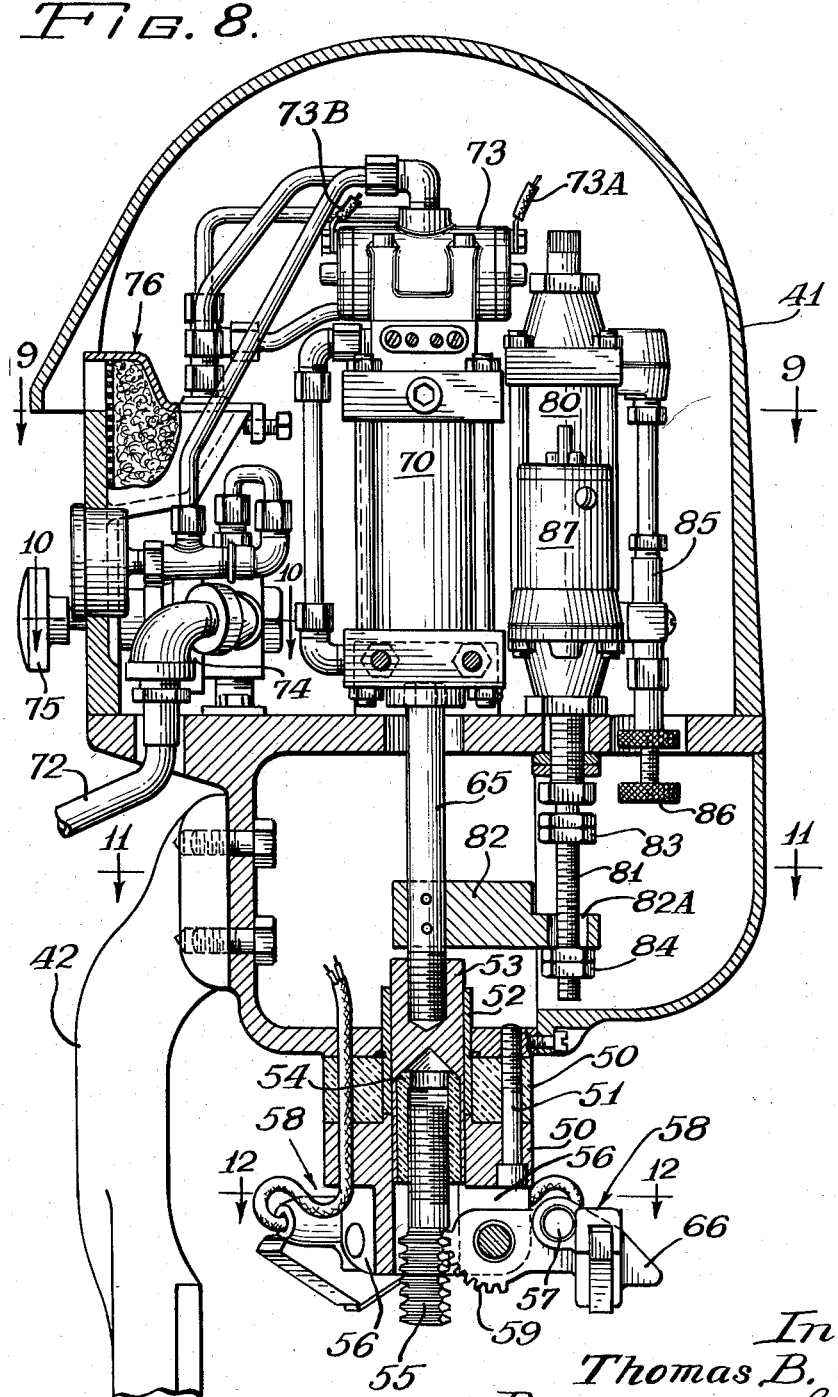
Fig. 8 is a vertical section taken along lines 8—8 of Fig. 7.

Referring to Figs. 6, 7, and 8, the sealing head 40 includes a set of collars secured to the bottom of the housing means by bolts 51, as in Fig. 8, there being a sleeve bearing 52 located centrally therein to seat a plunger 53 having an insulating insert 54 which receives the threaded end of a triangular gear rack 55.

The bottom collar is a casting having spaced flanges 56 (Figs. 19 and 20) arranged in three pairs, each of which is bored to receive a pin bearing 57 to pivotally support an appertaining one of the three sealing jaws 58, which are seen in open condition in Figs. 7 and 19.

Each of the sealing jaws 58 has a gear segment 59 which meshes with the teeth of one of the faces of the multi-faced or triangular rack 55 (Fig. 8; also Fig. 16) so that reciprocal movements of the latter, as by the piston rod 65, will rock the three jaws into and out of the open and closed conditions depicted respectively in Figs. 19 and 20. Each jaw has two faces arranged side by side to form a dihedral angle, and one of these faces is yieldable, as will later appear.

Each sealing jaw is also provided with a cavity 60 into which is fitted an electrical heating element 61 (Figs. 12 to 15) in the form of an insert cartridge, the conductors for which lead out one end of the cavity bore.

As viewed in Figs. 13 and 15, it will be noted that each sealing jaw has a working face consisting of one solid jaw 58A and a yieldable jaw 58B, the latter fitting into a cavity 62 in the casting and being sprung outwardly by springs 63 and retained by pins 64. The relative arrangement of these faces is such that one yieldable jaw face 58B on one unit will always coact with a solid jaw face 58A on an adjacent jaw unit. By this means, at least one jaw face of each pair will have a solid metal conductive path for the heat from the appertaining heater element 61. Fig. 17 illustrates this feature particularly with the jaws closed together.

A still further characteristic of the sealer-jaw structure is the provision on each jaw of a pendant starter wing 66 (Figs. 16 to 20, particularly), the purpose of which is to engage the top portions of the paper cone in advance of the main jaw faces and to start a fold at a position thereon by reason of the location and shape of the wings, to effect a positively uniform trifoliate recession of the paper to form the three sealing wings 34B (Figs. 4 and 5) which are characteristic of the sealing of applicant's container.

Means for actuating the jaws in opening and closing operation is disposed in the upper portion of the housing shell 41 as depicted in Fig. 8, and includes a pneumatic ram 70, the air piston of which (not seen) connects to the upper end of the piston rod 65, said ram being of conventional construction and operating in known manner such that admission of compressed air to one or the other sides of the piston will displace the latter, and hence the piston rod 65, upwardly or downwardly with consequent pivoting of the jaws 58 owing to the action of the multi-faced or triangular rack 55 with gear segments 59.

Figure 9:
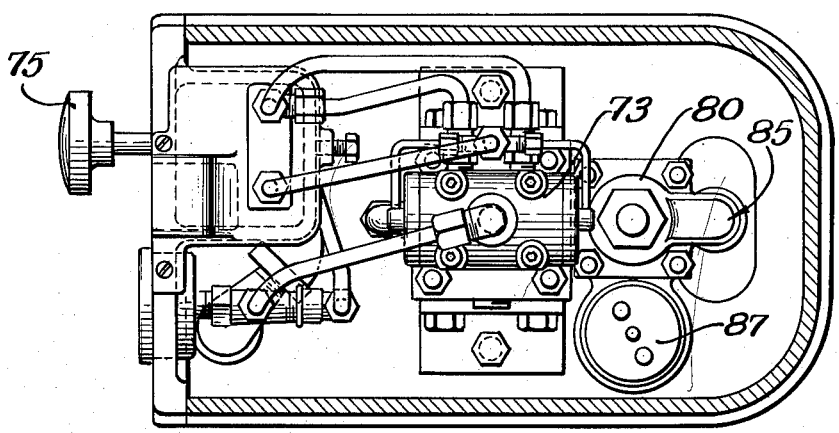
Fig. 9 is a horizontal section taken on lines 9—9 of Fig. 8.
Figure 10:
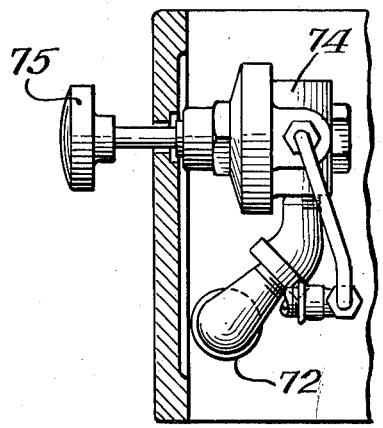
Fig. 10 is a partial section on lines 10—10 of Fig. 8 showing the regulating valve in plan.
Figure 11:
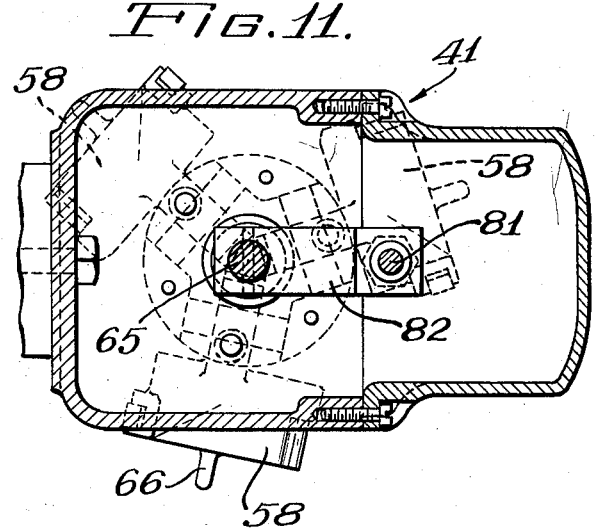
Fig. 11 is a section taken on lines 11—11 of Fig. 8 above the closing head.

Admission of air from supply line 72 for reverse operation of the air piston is controlled by a solenoid 73 (Fig. 9 also) of known construction receiving compressed air at adjusted pressure from a regulating valve 74 also situated on the housing and supplied with an adjustment knob 75 (Figs. 8, 9, and 10) accessible at the outside of the housing. The air piston exhausts through a noise-suppressing filter muffler 76 (Fig. 8).

Solenoid 73 is energized in reverse operation via conductors 73A, 73B (Fig. 8) under control of feeler switches (not seen) located in the power unit or base 46 (Fig. 6) on which the carrier is mounted, these switches being actuated by cam means (not seen) moving in timed relation to the step-by-step movements of the carrier 35 in such manner that each time the carrier comes to rest the solenoid 73 is actuated by one of the cam switches in the direction to cause the sealer jaws to close during the ensuing dwell interval in which the carrier will remain at rest, said jaws opening again responsive to a reverse energizing pulse to the solenoid 73 by the other cam switch, this action being timed to occur before the carrier again starts to advance, in order that the jaws 58 may be fully open before the next step of the carrier commences.

For successful operation, the inter-convergent action of the dihedrally situated sealer jaws 58 must be contrived to occur very rapidly at first—until the pairs of meeting jaw faces are nearly closed with the paper fold-in practically completed, at which juncture the remaining travel of the jaws in finally clamping home against the paper becomes a deliberate squeeze which is relatively much slower than the initial closing movement of said jaws. In this manner the sealing operation is speeded up without danger of effecting a poor seal or damaging the paper, the final slow-action sealing squeeze being, as a result, sufficiently prolonged to procure a good seal and being achieved by use of an hydraulic check means acting to snub the upward movement of the piston rod 65 near the end of its stroke.

The hydraulic check means, as viewed in Fig. 8, includes an hydraulic ram 80 from which depends a threaded piston rod 81 freely embraced by one end 82A of a snubbing arm 82 fixed on the main piston rod 65. Threadedly adjustable on the check rod 81 are upper and lower stop nuts 83 and 84 which are set so that the main piston rod 65 is free to rise rapidly until the end 82A of the snubbing arm strikes the upper stop nut 83 and drives the hydrocheck piston rod 81 upwardly so that the associated piston (not seen) in cylinder 80 will drive contained oil through an adjustable relief valve line 85 (adjustable at 86) into an oil reservoir 87. In the opposite or opening direction, the jaws 58 are adequately cushioned by the ram 70 itself.

By proper adjustment of the snubbing nuts 73, 84, and the relief of needle valve means 85, 86, the sealing squeeze of the jaws 58 can be delicately set for fast action and yet produce an excellent seal.

The heat-sealing operation is completed before the carrier 35 resumes its advance, at which time the packaged item will appear, as in Figs. 4 and 5.

In order that the sealed conical cup can be safely transported away from the sealing station, the apex portion thereof is guided between a pair of guide arms 90 (Figs. 6, 7, and 16) carried on the support 43 of the sealer unit to underlie the carrier 35 and positioned pockets therein, for reasons to appear.

A further feature in this connection is the provision of a cone-turning or orienting means in the form of a rubber-covered finger 92 (Figs. 6, 16, and 19) attached to the support means 43 about opposite the carrier and at a position to be transiently scraped by the side of the paper cone as the same advances with the carrier after the sealing jaws open, by reason of which the cone is rotated sufficiently to assure the clearance between the sealed trifoliate wings 34B on the package, and the open jaws 58 to freely pass the latter.

After leaving the sealing station at the sealer unit 40, the finished cones are usually removed from the carrier 35 by hand and packed in cartons for transport into low-temperature hardening rooms until ready for shipment.

The construction and operation of the described closing and sealing means renders the same economically useful in conjunction with a continuous-flow manufacturing process and apparatus of the type alluded to and in which the paper cups themselves are formed as the initial operation and step in the fabrication of a packaged and sealed ice cream confection of the class described.

It is contemplated, however, that the disclosed mechanism can be modified and utilized in other applications without departing from the scope of the invention as defined in the following claims.

I claim:

1. Heat-sealing mechanism comprising: a sealing head adapted for mounting above a step-by-step carrier for paper cone cups having heat sealable adhesive at the upper rim portion thereof; a plurality of electrically heated sealing jaws each pivotally mounted at the bottom of said head about a common center to close together about said center and open outwardly therefrom; means for opening and closing said jaws and including a multi-faced gear rack and means mounting same to reciprocate along an axis through said common center of the jaws and normally to the pivotal axis of the latter; gear means on each jaw meshing with one of the faces of said rack such that reciprocation of the latter will converge and diverge said jaws; and reversely-operable fluid-displacement means in said head and having driving connection with said rack to move the latter reciprocably; said head being adapted for mounting at a level above a carrier, as aforesaid, such that said jaws will converge upon the upper rim portions of said cups in the carrier and fold the same compressibly together for sealing.

2. Apparatus according to claim 1 in which said jaws are three in number and said gear rack has three faces each of which intermeshes with the gear teeth on one of said jaws.

3. Apparatus according to claim 1 further characterized in that said jaws are three in number and each jaw has a solid face and a yieldable face so situated that when the jaws converge the solid face of one jaw confronts the yieldable face of another jaw.

4. In a sealing device including jaws convergible upon the rim portions of a cup-like paper container to close said portions together, jaw mechanism comprising: three jaw members and means mounting the same in a cluster about a common center for pivotal movement to converge upon and diverge from said center, each jaw having a pair of jaw faces forming a dihedral angle, one face of which is solid and the other of which is yieldable, said jaws converging to bring a solid face of one jaw into confrontation with the yieldable face of another jaw, and gear actuating means common to said jaws and operable to open and close the same in unison, each jaw having a pendant finger situated for engagement with the rim portions of a cup as aforesaid in advance of the engagement therewith of any of said jaw faces, whereby to start the fold-in in a predetermined manner for completion by the converging jaw faces as aforesaid.

5. Mechanism according to claim 4 further characterized in that said gear actuating means consists of a gear segment on each jaw and a single gear rack reciprocating along a common axis normal to the pivotal axis of each jaw and located concentrically of each jaw in the cluster, and reciprocable to move the jaws in unison.

6. Mechanism according to claim 5 further characterized by the provision of means for reciprocating said gear rack in the form of a reversible air-driven piston operatively connected to the rack, and means for controlling admission of compressed air reversely to actuate the piston.

7. Apparatus according to claim 4 further characterized by the provision of snubbing means cooperable with said gear actuating means to resist a limited amount the movement of the jaws only at the instant concurring with the seizure of said cup rim portions by said jaws.

8. Jaw mechanism for closing the rim portions of conical paper cups seated in a circumferential series on a rotatable carrier moved step-by-step relative to a closing station, said mechanism comprising: a plurality of jaws pivotally mounted about a common center overlying said station and the major cone axis through a cup therebelow in the carrier; said jaws being pivotable to converge upon said rim portion of a cup to close the same together; leading fold-in projections on said jaws to start a folding of said rim portions to form closed upstanding wings thereof completed by full convergence of the jaws thereon; and actuating means cooperable with said jaws for rapidly converging and diverging the same in unison; together with snubbing means cooperable with said actuating means to check the converging movement of the jaws substantially at the moment of final squeezing convergence thereof upon said rim portions whereby to prevent damage to the rim portions and to provide a predetermined movement of squeezing dwell before the jaws are diverged.

9. In a machine for closing and heat-sealing conical paper cups of the type having a heat sealable adhesive adjacent the rim portions thereof, said machine comprising: a rotatable carrier with pockets for seating said cups serially, a sealing head located at a sealing station overlying the path of said carrier pockets; a set of heated closing jaws on said head positioned to engage and close together top rim portions of a cup in a carrier pocket therebelow and form sealed upstanding wings of said rim portions; means in said head operable in timed relation to movements of the carrier to open and close said jaws during an interval in which the carrier is at rest; guide means mounted in stationary relation to said head and carrier to freely pass the apex portions of a sealed cup and stabilize the same against lateral movements in a certain direction and a frictional orienting finger mounted in stationary relation to the head and carrier to project laterally in the certain direction aforesaid into the path of said apex portions of a sealed cup and engage the same as said cup is moved by said carrier away from the sealing station, whereby to turn the sealed cup in its seat and thereby orient said wings relative to said jaws in their open condition so as to clear the jaws on moving away from said station.

10. Heat sealing mechanism comprising: three jaw members each having a pair of dihedrally-arranged pressure faces, means mounting said members in equally spaced relation about a common center for pivotal movement about axes all lying in the same plane with said center to rock in a converging and diverging sense and such that a pressure face of each jaw member confronts a pressure face on an adjoining member in converging condition; a gear segment formed as an integral part of each jaw member in a position to be disposed radially of said common center, a gear rack reciprocable along an axis through said center and normal to said plane containing the pivotal axis of the jaw members and meshing with all of said gear segments so as to pivot the appertaining jaw members convergently and divergently in unison depending upon the direction of movement of said rack; a long bore extending along a line behind the appertaining dihedral pressure faces in each jaw member; and an electrically energized heater element in each bore.

11. A container closing and sealing mechanism comprising a frame, means mounted on said frame for holding a container having an open end with a circular rim at a point spaced from said rim, a head mounted on said frame adjacent the position of a rim of a container held in the holding means and in the major axis of such a container, at least three arms mounted on the head on pivots whose axes lie in a plane normal to the major axis of the container, tangent to the same circle centered on the major axis, and equally spaced from each other, means for simultaneously moving the arms to a work position adjacent said major axis, a jaw face on each arm consisting of two faces lying in intercepting planes parallel to the major axis and with the line of interception substantially in the major axis when in work position, the jaw faces mating around said major axis with their faces in contact, and means for heating said jaw faces.

12. The container closing and sealing mechanism of claim 11 wherein the container holding mechanism is conical for holding a conical container.

References Cited in the file of this patent

UNITED STATES PATENTS

| | | |
|---|---|---|
| 1,875,979 | Beutel | Sept. 6, 1932 |
| 2,011,198 | Morey | Aug. 13, 1935 |
| 2,518,970 | Zabel | Aug. 15, 1950 |
| 2,552,094 | Hamon | May 8, 1951 |
| 2,608,333 | Marziani | Aug. 26, 1952 |
| 2,615,113 | Frye | Oct. 21, 1952 |
| 2,732,988 | Feinstein | Jan. 31, 1956 |
| 2,751,965 | Miller | June 26, 1956 |